United States Patent [19]

Horacek et al.

[11] Patent Number: 5,232,976
[45] Date of Patent: Aug. 3, 1993

[54] THERMALLY EXPANDABLE FIRE-PROTECTION COMPOSITION COMPRISING EXPANDABLE GRAPHITE, CHLOROPRENE LATEX AND COMPOUNDS FORMING A PARACRYSTALLINE CARBON SKELETON

[75] Inventors: Heinz Horacek, Linz; Hermann Wudy, Pfaffstätten, both of Austria

[73] Assignee: Chemie Linz Gesellschaft m.b.H., Linz, Austria

[21] Appl. No.: 985,749

[22] Filed: Dec. 4, 1992

Related U.S. Application Data

[63] Continuation of Ser. No. 585,154, Oct. 9, 1990, abandoned.

[30] Foreign Application Priority Data

Apr. 7, 1988 [AU] Australia ................... 889/88

[51] Int. Cl.⁵ .................... C08J 5/10; C08K 3/04; C08L 13/02
[52] U.S. Cl. .................... 524/495; 524/496; 523/179
[58] Field of Search ............. 524/495, 496; 523/179

[56] References Cited

U.S. PATENT DOCUMENTS

| | | | |
|---|---|---|---|
| 3,574,644 | 4/1971 | Olstowski et al. | 106/15 |
| 3,639,298 | 2/1972 | Lister et al. | 260/2.5 |
| 4,255,318 | 3/1981 | Kaide et al. | 260/42.18 |
| 4,277,532 | 7/1981 | Czepel et al. | 428/244 |
| 4,699,945 | 10/1987 | Hausdorf et al. | 524/512 |

FOREIGN PATENT DOCUMENTS

| | | |
|---|---|---|
| 1058455 | 7/1979 | Canada . |
| 1151519 | 8/1983 | Canada . |
| 0012906 | 7/1980 | European Pat. Off. . |
| 3515097 | 9/1986 | Fed. Rep. of Germany . |
| 3536371 | 5/1987 | Fed. Rep. of Germany . |
| 3625080 | 1/1988 | Fed. Rep. of Germany . |
| 2265838 | 10/1975 | France . |
| 8802019 | 3/1988 | PCT Int'l Appl. . |

OTHER PUBLICATIONS

Chem. Abstr. 91: 212736y (1979).
Chem. Abstr. 107: 97708 (1987).
Chem. Abstr. 109: 39558(g) (1988).

Primary Examiner—Paul R. Michl
Assistant Examiner—U. K. Rajguru
Attorney, Agent, or Firm—Wenderoth, Lind & Ponack

[57] ABSTRACT

A thermally expandable fire-protection compound consisting of expandable graphite, an aqueous chloroprene latex containing carboxyl groups, and substances which, in the event of fire, form a paracrystalline carbon skeleton.

7 Claims, No Drawings

THERMALLY EXPANDABLE FIRE-PROTECTION COMPOSITION COMPRISING EXPANDABLE GRAPHITE, CHLOROPRENE LATEX AND COMPOUNDS FORMING A PARACRYSTALLINE CARBON SKELETON

This application is a continuation of now abandoned application, Ser. No. 07/585,154, filed on Oct. 9, 1990.

The invention relates to thermally expandable fire-protection compositions or fire-protection laminates, which contain expandable graphite, a chloroprene latex containing carboxyl groups, and substances selected from the group consisting of polyacrylonitrile, cellulose or derivatives thereof, phenol/formaldehyde resins, polyfurfuryl alcohol and polyimides, and to a process for the production thereof.

Thermally expandable fire-protection compounds, which consist of expandable graphite, chloroprene rubber, a phenolic resin, an organic solvent and, if appropriate, additionally of hydrated alumina and inorganic fibers, have been described, for example, in U.S. Pat. No. 4,277,532. In preventive fire protection, they prove to be particularly effective above all because of their excellent resistance to moisture, frost, heat, light and industrial climates, and because of their high expansion pressure. Under the action of heat and fire, they expand in the event of fire in the opening which is to be protected, at a relatively low flowability. As a result, the expanding compound also does not avoid obstacles in an opening which is not completely sealed and, due to its high expansion pressure or extension pressure, which normally is above 2 bar, forms a tightly sealing barrier layer, whereby a further spread of heat, fire and smoke gases is reduced or delayed, or completely prevented. This sealing material has a high mechanical strength even in the expanded state. A disadvantage in the production, processing and application of such compounds is, however, their brittleness and low flexibility. A further disadvantage is that, in producing them, organic solvents are used which require a greater expenditure on equipment and a greater labor effort for solvent recovery and for minimizing any environmental pollution and health hazard caused by solvents.

The use of solvent-free fire-protection compounds consisting of expandable graphite and a polymeric binder has been described in WO 88/02,019. The polymeric binder can be either a flexible binder, for example polyvinyl acetate, an elastomeric binder, for example a chloroprene polymer, a thermosetting binder, for example a formaldehyde resin, or a thermosetting binder with an addition of a flexible binder. However, the disadvantage of these fire-protection compounds is that, in the case of using flexible or elastomeric binders, although they have a sufficient flexibility which is required for easy handling, the stability and hardness, which are necessary for perfect sealing against further spreading of the fire, of the barrier layer formed after the expansion in the event of fire is too low. Because of their high hardness, fire-protection compounds based on thermosetting binders can be processed only with great difficulty, and although the crust formed after the expansion in the event of fire is hard, it is also cracked and brittle and does not form a sufficiently stable and tight barrier layer.

It was the object of the invention to eliminate these disadvantages arising with the known fire-protection compounds and, above all, to obtain less brittle compounds which form a sufficiently stable and hard barrier layer in the event of fire and do not require any organic solvents in the production thereof. It was possible to achieve the object by means of a fire-protection compound which was obtained by the combination of three defined components.

The subject of the present invention is accordingly a thermally expandable fire-protection compound, which comprises 25 to 60% by weight of expandable graphite, 5 to 25% by weight, calculated as solids, of a chloroprene latex with at least 0.3 mole of carboxyl groups per 1 kg of latex solids, 5 to 25% by weight of substances selected from the group consisting of polyacrylonitrile, cellulose or derivatives thereof, phenol/formaldehyde resins, polyfurfuryl alcohol and polyimides, and, if appropriate, further additives.

It proves here to be particularly advantageous if the fire-protection compounds do not contain any organic solvents but, instead, if latex dispersions on an exclusively aqueous basis are used. Because of the residual water content present, these fire-protection compounds show a more favorable fire behavior than in the case of the use of organic solvents. Because of the absence of organic solvents, they can be produced and processed with substantially greater ease and substantially less pollution of the environment. Above all because of the content of elastomeric chloroprene polymer, the fire-protection compounds according to the invention show good elasticity and flexibility so that they, or laminates or boards produced from them, can easily be applied, processed and handled. Depending on the particular composition of the fire-protection compound, very high expansion pressures, preferably more than 5 bar, and hence particularly effective sealing can be achieved in the event of fire. The barrier layer formed after the expansion is distinguished by its strength, hardness and stability, so that it does not form cracks and is not destroyed by the thermal, mechanical and aerodynamical stresses and fire turbulence in the event of fire.

The expandable graphite used can be produced, for example, by acid treatment of a natural graphite with fuming nitric acid, as described in U.S. Pat. No. 3,574,644 or by H. Spatzek, Carbon 86 (1986).

The chloroprene latex is usually produced by copolymerization of chloroprene with acrylic acid or methacrylic acid. Such latices are, for example, commercially available as Skyprene ® (Toyo Soda), Bayprene ® (Bayer), Butaclor ® (Distugil), Denka Chloroprene ® (Druki Kagaku Kogyo), Nairit ® (USSR) or Neoprene ® (Du Pont).

The substances from the group consisting of polyacrylonitrile, cellulose or derivatives thereof, phenol/formaldehyde resins, polyfurfuryl alcohol and polyimides form a paracrystalline carbon skeleton in the event of fire. When they are heated in the event of fire, these substances first crosslink, and the strong intermolecular bonds are preserved even during further thermal stress, which leads to pyrolytic decomposition and finally to the formation of the paracrystalline carbon skeleton (Chemie-Ing.-Techn. 42 No. 9/10 (1970), pages 659–669). Three-dimensionally crosslinked thermosets such as, for example, phenol/formaldehyde resins prove to be particularly suitable in this case. Phenolic resins with tertiary butyl groups such as, for example, p-tert-butylphenol/formaldehyde resin 7520E or 7522E made by Rousselot, show particularly good results.

Examples of additives which modify the fire behavior are melamine and its derivatives, various graphite salts, cyanuric acid derivatives, dicyandiamide, halogenated hydrocarbons, polyammonium phosphates and guanidine salts. These substances also expand with decomposition under the action of heat. Since they have a decomposition temperature which differs from that of expandable graphite, the expansion pressure also increases with rising temperature in the event of fire, so that more complete sealing of the opening takes place.

Moreover, further additives, which above all improve the strength of the sealing compound in the expanded state, consolidate the crust and increase the cohesion, such as, for example, inorganic fibers, for example mineral fibers or glass fibers, glass powders, vermiculites, bentonites, silica, silicates, borax, starch, sugar, chloroparaffins, aluminum sulfate, hydrated alumina or magnesium hydroxide, can also be used. Furthermore, flame-proofing agents can be added, for example halogenated or phosphorus-containing hydrocarbons such as, for example, tris-chloropropyl phosphate, dibromoneopentyl glycol or antimony trioxide. Moreover, those additives can also be used which assist in increasing the foam formation in the event of flame action. Examples of these are salicylic acid, p-hydroxybenzoic acid, PVC and also nitrogen hydrazides or sulfo hydrazides, triazoles, urea-dicarboxylic anhydride and ammonium carbonate.

The fire-protection compound according to the invention can be used both as a paste and in the form of boards, strips, tapes or moldings. Fire-protection laminates, in which the fire-protection compound has been laminated to a carrier web, for example a glass fiber mat, are particularly advantageous and easy to apply. For decorative reasons or, for example, for protecting the fire-protection compound, the laminates or boards can be covered by a covering layer, for example a plastic film, e.g. a PVC film, paper or aluminum sheet, on one side or both sides. It is also possible to finish the fire-protection laminates or boards with an adhesive layer which is then advantageously covered by a backing film.

The fire-protection compounds according to the invention are produced by mixing and homogenizing expandable graphite, a latex dispersion which contains carboxyl groups and is preferably aqueous, substances preferably a phenol/formaldehyde resin or polyimide resin, and, if appropriate, further additives which modify the fire behavior, for example in a kneader, dissolver or mixer. The compound thus obtained can either be used as such or it can be applied to a carrier web, for example a sheet or a nonwoven (for example by means of a blade). After drying, the laminate can be compressed on a calender, if appropriate with an embossing roller, and if appropriate with simultaneous lamination to a covering layer, for example of PVC or aluminum.

The fire-protection compounds according to the invention are used for fire-protecting sealing or isolation of openings in building components which form a fire section, such as, for example, gaps between walls, cavities or interspaces, wall breaks, cable ducts or the like. Likewise, door seals, window seals or other seals can be produced which foam up in the event of fire and seal the slot or the opening located in front. The joint between glass and frame in fire-protection glazing by means of the fire-protection compounds or laminates according to the invention also gives perfect fire protection. The fabrication of complete bricks, with which breakthroughs for cables or pipes are lined and which form a barrier under the action of fire, is also possible. In the event of fire, these compounds foam up under the action of heat and seal the opening, so that the further passage of fire and smoke and hence further spreading of the fire are prevented.

EXAMPLES 1-15 AND COMPARISON EXAMPLE 16

The raw materials (stated in parts by weight) listed in Tables 1 and 2 are added in a stirred vessel in the following order: additives, Al(OH)$_3$, phenolic resin, 50% aqueous chloroprene latex dispersion, expandable graphite, mineral fibers (Inorphil ® 061-60, made by G. M. Langer, Federal Republic of Germany). The compound was in each case homogenized for 1 hour by means of a dissolver with a toothed disk at 30° C. and at a pH of 10 (adjusted by means of KOH). The viscosity was about 4 Pas, measured at 30° C. in a Brookfield viscometer (spindle 7, 20 rpm). The fire-protection compound obtained was then applied by means of a blade to a glass mat having a weight per unit area of 50 g/m$^2$ and dried at 190° C.

The expandable graphite was obtained by acid treatment of a natural graphite with fuming nitric acid. The phenolic resin used was a tert-butylphenol/formaldehyde resin, type 7520E made by Rousselot, France.

Commercially available latex dispersions based on a copolymer of chloroprene and methacrylic acid were used. The carboxyl group content indicated in each case in Tables 1 and 2 was adjusted by mixing the following latices of different carboxyl group contents: Neoprene ® 115 (Du Pont): 0.33 mole of COOH per 1 kg of latex solids, Neoprene ® 750 and Neoprene ® 824A: no COOH content, Bayprene ® 4R (Bayer): 0.23 mol of COOH per 1 kg of latex solids. In Comparison Example V 16, a 10% chloroprene solution in toluene was used in place of the aqueous latex dispersion, under otherwise the same conditions.

The properties of the fire-protection laminates are also listed in Tables 1 and 2. The expansion pressure was measured at 250° C. on samples having a diameter of 113 mm and inserted between two heatable metal plates. The pressure generated on expansion was transmitted from the lower plate to a force transducer with pressure indication. The expanding material was here not delimited sideways and was able to spread unhindered in the plane. The expansion height was measured on samples having a diameter of 50 mm and inserted into a metal cylinder of 100 mm height and an internal diameter of 50 mm. The cylinder with the sample, preloaded with 100 g via a ram, was heated for 10 minutes in an oven at 300° C.

TABLE 1

| | (Raw materials in parts by weight) | | | | | | | |
|---|---|---|---|---|---|---|---|---|
| | Example | | | | | | | |
| | 1 | 2 | 3 | 4 | 5 | 6 | 7 | 8 |
| Moles of carboxyl per 1 kg of latex solids | 0.33 | 0.33 | 0.05 | 0.33 | 0.05 | 0.33 | 0.33 | 0.33 |
| Latex | 21 | 30 | 30 | 27 | 21 | 27 | 27 | 27 |
| Phenolic resin | 3 | 4 | 4 | 4 | 10 | 10 | 4 | 12 |
| Inorphil ® | — | 2 | 2 | — | 2.1 | — | — | — |
| Expandable graphite | 57 | 53 | 53 | 57 | 57 | 48 | 57 | 57 |
| Al(OH)$_3$ | — | 11 | — | — | 9.9 | — | — | 4 |
| Additives[3] | 19/A | — | 11/B | 12/B | — | 12/B | 12/C | — |
| Properties | | | | | | | | |
| Unexpanded[1] | + | + | — | + | — | + | + | + |

TABLE 1-continued

| (Raw materials in parts by weight) | | | | | | | | |
|---|---|---|---|---|---|---|---|---|
| | Example | | | | | | | |
| | 1 | 2 | 3 | 4 | 5 | 6 | 7 | 8 |
| Expanded[2] | + | + | − | + | − | + | + | + |
| Thickness (mm) | 2.4 | 2.5 | 2.8 | 2.5 | 2.5 | 2.4 | 2.6 | 2.2 |
| Weight per unit area (kg/m$^2$) | 2.56 | 2.02 | 2.16 | 2.50 | 2.50 | 2.43 | 2.47 | 2.05 |
| Expansion pressure (bar) | 12.5 | 6.8 | 7 | 8 | 6 | 8.5 | 9.6 | 8.7 |
| Expansion height (mm) | 19 | 17 | 20 | 20 | 13 | 15 | 13 | 17 |

[1] + flexible, − brittle
[2] + stable and hard, − unstable
[3] A aluminum sulfate
B dicyandiamide
C melamine

TABLE 2

| (Raw materials in parts by weight) | | | | | | | | |
|---|---|---|---|---|---|---|---|---|
| | Example | | | | | | | |
| | 9 | 10 | 11 | 12 | 13 | 14 | 15 | V16 |
| Mole of carboxyl per 1 kg of latex solids | 0.33 | 0.17 | 0 | 0.23 | 0.33 | 0.33 | 0.23 | 0 |
| Latex | 27 | 27 | 27 | 27 | 25 | 40 | 22 | 55 (toluene) |
| Phenolic resin | 4 | 4 | 4 | 4 | 6 | 7 | 6.5 | 5 |
| Inorphil ® | — | — | — | — | 1.4 | — | 1.5 | 1.3 |
| Expandable graphite | 57 | 57 | 57 | 57 | 54.6 | 37 | 42 | 29.3 |
| Al(OH)$_3$ | — | — | — | — | 13 | 5 | 14 | 9.4 |
| Additives[3] | 12/D | 12/E | 12/F | 12/G | — | 11/H | 14/H | — |
| Properties | | | | | | | | |
| Unexpanded[1] | + | − | − | − | + | + | − | +/− |
| Expanded[2] | + | − | − | − | + | + | − | + |
| Thickness (mm) | 2.3 | 2.5 | 2.2 | 2.2 | 2.5 | 2.6 | 2.5 | 2.5 |
| Weight per unit area (kg/m$^2$) | 2.79 | 3.53 | 2.47 | 1.84 | 3.6 | 2.8 | 3.0 | 2.5 |
| Expansion pressure (bar) | 12 | 13 | 8.6 | 8.8 | 13 | 10 | 8 | 3 |
| Expansion height (mm) | 12 | 19 | 13 | 17.5 | 19 | 17 | 12 | 18 |

[1] + flexible, − brittle, +/− a little flexible
[2] + stable and hard, − unstable
[3] D starch
E borax
F quanylurea sulfate
G guanidine phosphate
H quanidine carbonate

EXAMPLE 17

Small-fire test with laminates according to Examples 13 and V16

In order to prove effective sealing of an opening by the fire-protection compound according to the invention in the event of fire, two 20 cm long PVC pipes having an external diameter of 16 cm and a wall thickness of 3.5 mm were each wound with 230 g of 15 cm wide fire-protection laminate according to Example 13, which was also laminated on the mat side to a 0.05 mm thick aluminum foil, so that the expandable graphite was located on the pipe side. The wound pipes were each packaged in a zinc sheet sleeve and each inserted into a bore (22 cm diameter) in a 10 cm thick light concrete slab (Ytong ®). The pipes protruded for 5 cm from the bore on both sides of the slab.

Two analogously wound pipes were inserted into two further, similar bores of the light concrete slab, but a fire-protection laminate according to Comparison Example V16 was used in place of the fire-protection laminate according to the invention. The laminate, which was slightly less flexible, showed small cracks and points of easy fracture during winding.

The light concrete slab was then installed analogously to DIN 4102 in a small fire chamber and subjected to a flame from one side up to a temperature of about 1,000° C. in accordance with the standard temperature curve. The fire-protection compounds started to expand after about 4 minutes as a result of the heat, all 4 PVC pipes being softened and compressed. The isolations with the laminates according to Example 13 were completely sealed after 13 or 14 minutes respectively, and those with the laminates according to Comparison Example V16 after 13 or 17 minutes respectively, so that smoke gases, fire or soot no longer penetrated outwards. After 40 minutes, the outward-protruding pipe ends of the isolation according to the invention started to break apart, whereas the pipe ends of the isolations according to the Comparison Example started to melt off. After 60 minutes, the pipe ends had fully broken off or melted off, and the temperature of the expanded foam according to Example 13 was 290° C., and that of the expanded foam according to Comparison Example V16 was 310° or 370° C.

After 80 minutes, the test was terminated, without breakthroughs of flames or smoke gas being detectable. It was also found that, when the fire-protection compound according to Example 13 is used, the temperature on the side facing away from the fire was 20°-80° C. lower during the fire test than in the case of using the conventional fire-protection compound according to Comparison Example V16.

The hardness of the expanded foam according to Example 13 was measured after cooling by means of a compressive strength test on a pinching device 4045 according to DIN 53,421 and was 0.2 N/mm$^2$ (60% compression).

We claim:
1. A thermally expandable fire-protection composition which comprises 25 to 60% by weight of expand- able graphite, 5 to 25% by weight, calculated as solids, of a chloroprene latex with at least 0.3 mole of carboxyl groups per 1 kg of latex solids, 3 to 25% by weight of substances selected from the group consisting of polyacrylonitrile, cellulose or derivatives thereof, phenol/formaldehyde resins, polyfurfuryl alcohol and polyimides, with or without further additives, wherein the amount of chloroprene latex, calculated as solids, is solids is higher than the amount of substances selected from the group consisting of polyacrylonitrile, cellulose or derivatives thereof, phenol/formaldehyde resins, polyfurfuryl alcohol and polyimides.

2. The fire-protection composition as claimed in claim 1, which was produced by using a latex dispersion on an exclusively aqueous basis.

3. The fire-protection composition as claimed in claim 1 wherein the chloroprene latex is composed of a copolymer of essentially chloroprene and acrylic acid or methacrylic acid.

4. The fire-protection composition as claimed in claim 1, which contains a phenol/formaldehyde resin.

5. The fire-protection laminate, wherein a fire-protection composition as claimed in claim 1 is applied to a carrier web.

6. The fire-protection laminate as claimed in claim 5, wherein the fire-protection composition is covered by a covering layer.

7. A process for producing a fire-protection composition or a fire-protection laminate as claimed in claim 1, which comprises mixing expandable graphite, a latex dispersion which contains carboxyl groups and is aqueous, substances selected from the group consisting of polyacrylonitrile, cellulose or derivatives thereof, phenol/formaldehyde resins, polyfurfuryl alcohol and polyimides, with or without further additives with good homogenization, optionally applying the composition obtained to a carrier web and, optionally laminating the resulting laminate to a covering layer.

* * * * *